United States Patent [19]

Lingl, Jr.

[11] 3,951,283

[45] Apr. 20, 1976

[54] METHOD FOR BLENDING BRICKS

[75] Inventor: Hans Lingl, Jr., Paris, Tenn.

[73] Assignee: Lingl Corporation, Paris, Tenn.

[22] Filed: Apr. 17, 1973

[21] Appl. No.: 352,033

[52] U.S. Cl................................ 214/152; 214/6 A
[51] Int. Cl.² ........................................ B65G 57/00
[58] Field of Search................ 214/152, 6 A, 8.5 C, 214/8.5 D; 198/235; 294/63 R

[56] References Cited
UNITED STATES PATENTS

| | | | |
|---|---|---|---|
| 1,601,868 | 10/1926 | Luce | 214/6 A |
| 2,980,265 | 4/1961 | Johnson et al. | 214/1 BB |
| 3,095,678 | 7/1963 | Cliff et al. | 214/6 A |
| 3,215,250 | 11/1965 | Schubert | 198/242 |
| 3,279,664 | 10/1966 | Lynch | 214/8.5 D |
| 3,487,959 | 1/1970 | Pearne et al. | 214/152 X |
| 3,587,824 | 6/1971 | Rochla | 198/240 |
| 3,601,266 | 8/1971 | Pearne et al. | 214/8.5 C |
| 3,603,466 | 9/1971 | Lingl | 214/8.5 C |
| 3,647,093 | 3/1972 | Brooks | 214/8.5 C |
| 3,656,635 | 4/1972 | Schafer et al. | 214/8.5 C |
| 3,667,622 | 6/1972 | Kamphues et al. | 214/6 A |
| 3,669,283 | 6/1972 | Brown | 214/152 |
| 3,809,214 | 5/1974 | Reist | 198/235 |

FOREIGN PATENTS OR APPLICATIONS

| | | | |
|---|---|---|---|
| 1,608,681 | 9/1969 | Germany | 214/6 A |
| 1,018,500 | 1/1966 | United Kingdom | 214/6 A |

Primary Examiner—Robert J. Spar
Assistant Examiner—R. B. Johnson
Attorney, Agent, or Firm—Cushman, Darby & Cushman

[57] ABSTRACT

Method for more uniformly blending a layered stack of bricks having a central core section of lesser hardness and lighter color than in a surrounding outer shell section. The bricks are first unloaded from a hack into layers which include a corresponding core section and surrounding shell section. Thereafter, the bricks in each alternate layer are rearranged by placing bricks from the normally occurring core section areas into the normally occurring shell section areas and vice versa. Then the layers of bricks (both rearranged and unaltered) are restacked. The resulting stack will be blended such that when each "slice" of the stack is strapped into a packaged group of bricks, the resulting packaged groups will have approximately equal numbers of bricks having differing degrees of hardness and color.

8 Claims, 4 Drawing Figures

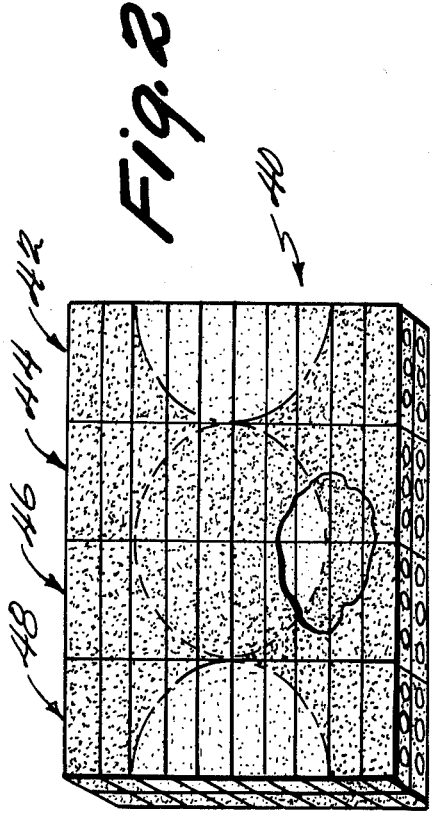
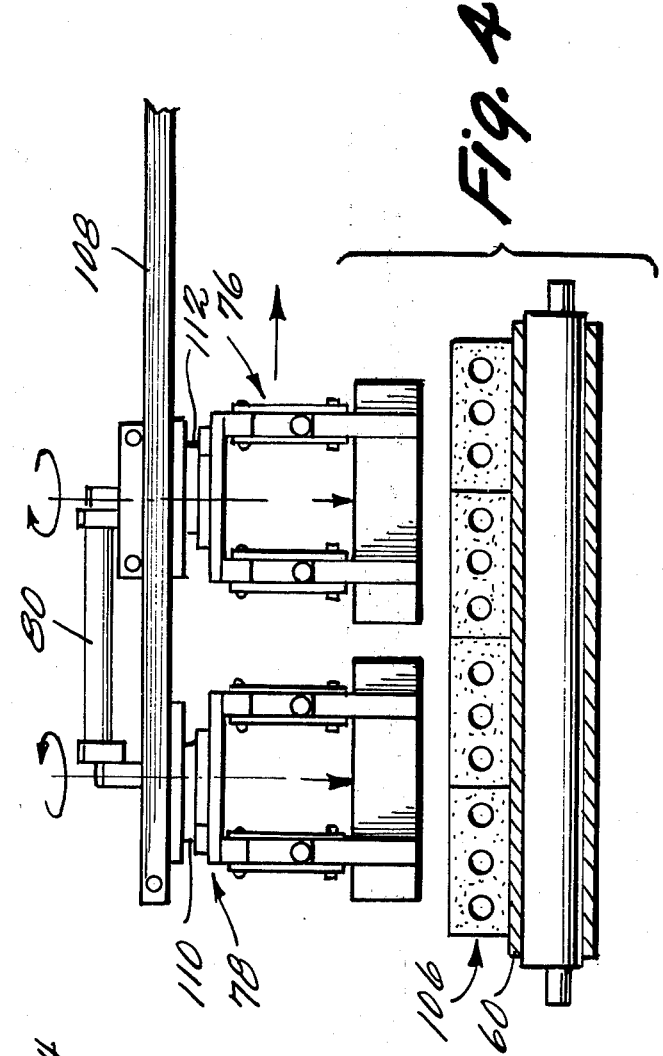
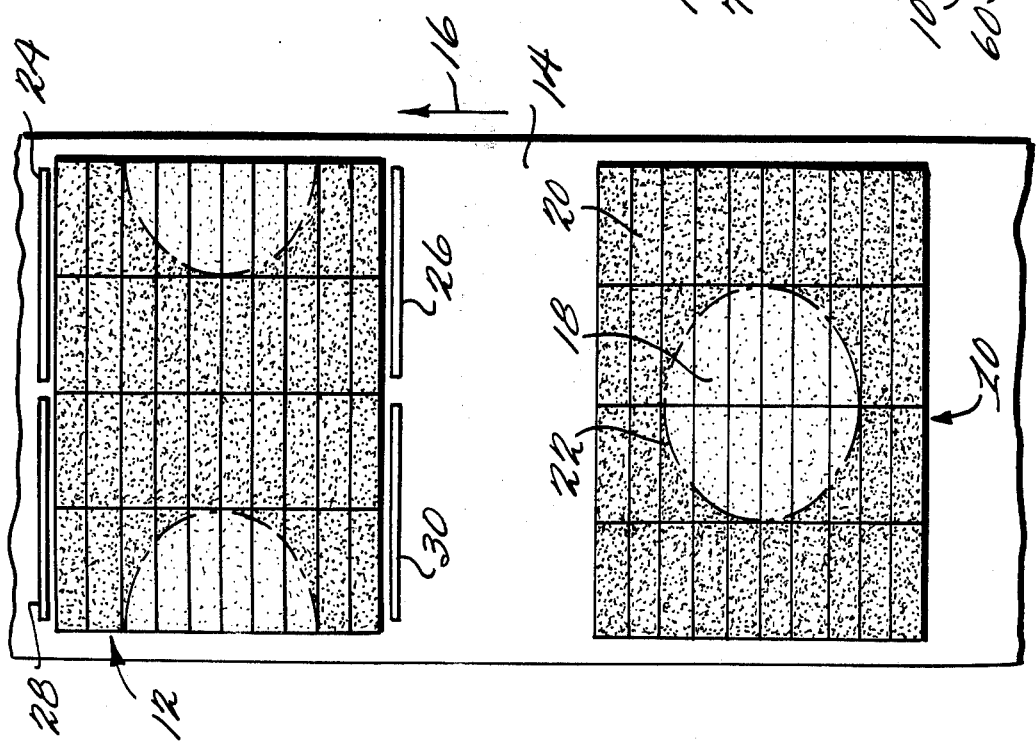

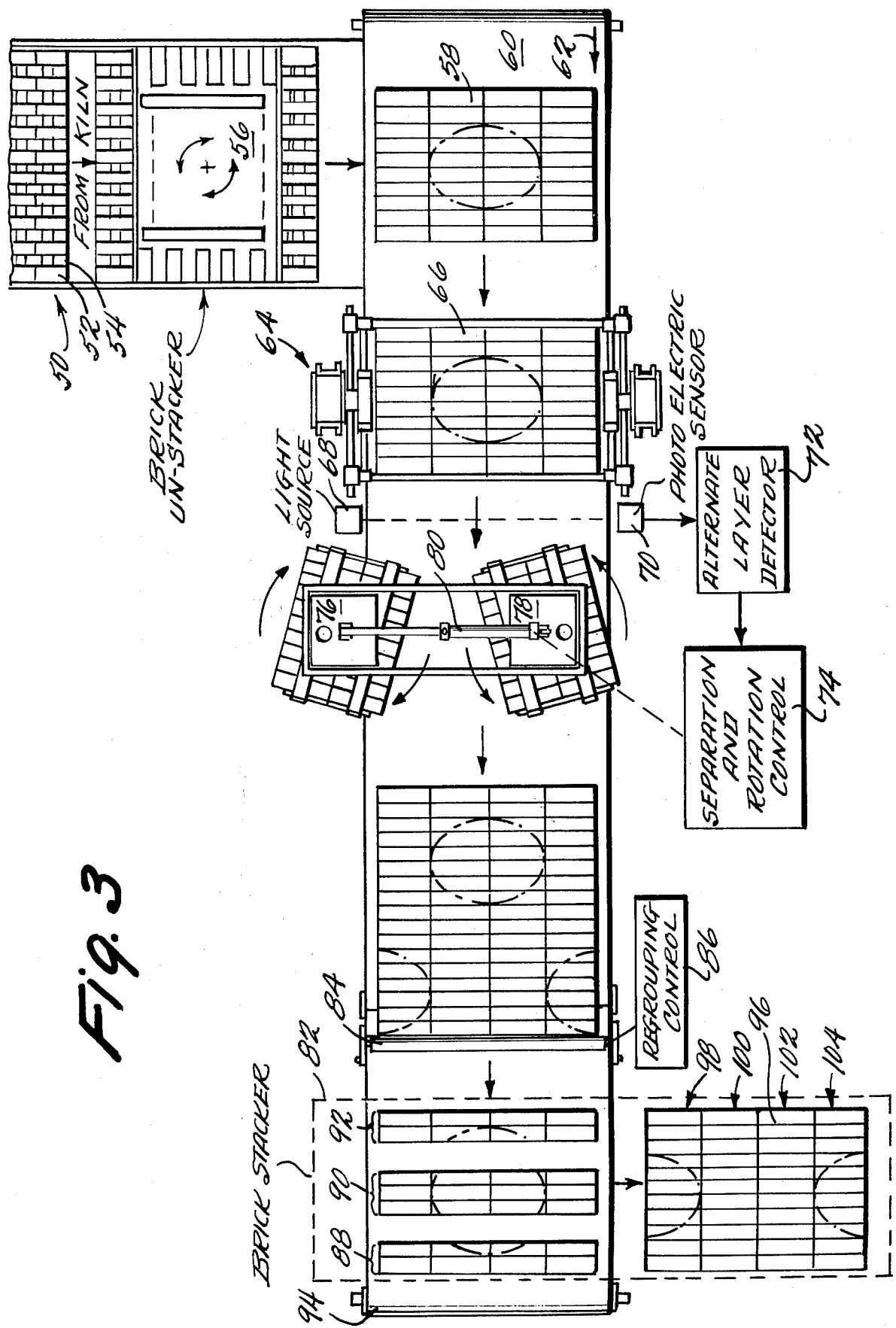

METHOD FOR BLENDING BRICKS

This invention generally relates to apparatus and method for blending bricks having different color and hardness characteristics depending upon their position within a hack of bricks after firing in a kiln.

As will be appreciated by those in the art, hacks of brick coming from a kiln are usually fired harder on the outside of the hack than in the inside or core section of the hack. Furthermore, when the bricks are flashed to produce different colors, differing degrees of penetration within the hack normally produce a darker colored outer shell and a lighter colored core section in each hack. Consequently, when the hack is subsequently taken apart in layers, these layers will also have corresponding core sections and outer shell sections with the respectively corresponding characteristics just described.

When bricks having such different characteristics are properly blended and incorporated into a brick wall, the result can be aesthetically pleasing. However, when the bricks are improperly blended, or not blended at all, the result is often undesirable from an aesthetic and/or structural point of view as will be apparent.

There have been many prior approaches to this problem resulting in brick blending systems such as described in my ealier U.S. Pat. No. 3,603,466 issued Sept. 7, 1971 and other United States Pats. such as Nos. 3,601,266; 3,656,635 and 3,669,283.

Typically, such prior art approaches have tried to blend the bricks by alternating the feeding of single rows of bricks into a stack or feeding system by various means. Accordingly, none of such systems are able to blend even percentages of bricks having various color and hardness characteristics in every slice of the stack because the bricks from the outside of the layer are always blended with other bricks from the outside of the layer. Similarly, those from the inside of the layer are always blended with other bricks from the inside of the layer with such prior art systems. Accordingly, because these prior art systems have attempted to achieve blending of individual rows of bricks within the fired hack, the actual blending capacity has been limited in spite of the rather elaborate and complex systems involved.

It has now been discovered that by rearranging predetermined layers of fired brick from the hack, rather than rows of bricks, it is possible to obtain a much more uniform blend of bricks wherein each slice of a resulting blended stack comprises a predetermined blend of bricks from both the center of the hack and from the outside of the hack. This new technique requires only relatively simple and reliable apparatus while yet providing a greatly improved effectiveness for the desired blending capability or function to be performed. Furthermore, the method and apparatus of this invention can be utilized in virtually any conventional brick unloading system as will become apparent from the following discussion.

In essence, the method and apparatus of this invention rearranges the individual layers of brick after they have been unloaded from fired hacks so that when these layers are again fed into an automatic stacking system, blends having similar percentages of bricks from the outside portion of the layers and from the inside portion of the layers are produced in every slice of the blended stack.

After the bricks have been unloaded from a kiln car, a plurality of corresponding layers of fired bricks will result with each layer having a central core and an outer shell section corresponding to the central core and outer shell of the fired hack as it was structured on the kiln car during the firing operation and having correspondingly different color and/or hardness characteristics as previously discussed. Each alternate one of these layers (or at least a predetermined proportion of such layers) are then rearranged by moving bricks from the normally occurring core section areas into the normally occurring shell section areas and vice versa before being fed into a conventional restacking mechanism where the rearranged layers are restacked together with the non-rearranged layers to form a new blended stack of bricks. Each vertical section or "slice" of brick rows in this new blended stack may then be strapped for shipment and will comprise a substantially equal (or other predetermined) blend of bricks having differing color and/or hardness characteristics.

There are several possible techniques that have been discovered for rearranging the alternate layers of bricks as discussed. The preferred embodiment involves separately gripping each half of the alternate layers as separate groups and rotating these halves by 180°. Another embodiment involves transposing the two halves of each alternate layer. After reading the disclosure herein it will be apparent that there are other possible rearrangement techniques.

These and other objects and advantages of this invention will be more clearly appreciated from the following detailed description taken in conjunction with the accompanying drawings, of which:

FIG. 1 is a plan view of two successive layers of fired brick arranged according to an exemplary embodiment of the blending operations involved in this invention;

FIG. 2 is a perspective and partly cutaway view of a blended stack of bricks resulting from restacking the brick layers shown in FIG. 1;

FIG. 3 is a plan view of an exemplary embodiment of a system for blending bricks according to this invention; and FIG. 4 is a more detailed side view of the blending station within the exemplary system of FIG. 3.

FIG. 1 shows successive layers of fired bricks 10 and 12 moving on a conveyor belt 14 in the general direction of arrow 16. Each layer initially appears like layer 10 in FIG. 1 when it is first unloaded or dehacked from the hack of fired brick. That is, the layer 10 comprises a central core section 18 having generally lighter color and less hard bricks than a surrounding shell section 20.

For purposes of illustration in FIG. 1, the differences in color and hardness have been schematically depicted by different concentrations of stippling marks within and without a generally elliptical area defined by dotted lines 22. Of course, as those in the art will appreciate, the actual transition between the central core section 18 and the outer shell section 20 is not so sharp. Rather, it is a more gradual change in color and hardness characteristics. Nevertheless, for purposes of illustrating exemplary embodiments of the invention, the well-defined transition as shown in FIG. 1 is useful.

To achieve substantially equal blends of hardness and color in the preferred embodiment, every other one (each alternate one) of the layers of bricks will be operated on as discussed to form a rearranged layer 12 as shown in FIG. 1. In general, it can be observed that the left half of the layer 12 has been effectively transposed with the right half of the layer. Actually, this can be performed in a number of ways. One way is to simply grip the left half of the layer with conventional grippers 24, 26 and the right half of the layer between conventional grippers 28, 30 which then pick up their respective halves and rotate about each other without turning to place the layer back on the conveyor 14 in the position shown in FIG. 1.

Another more preferred embodiment would involve gripping the two separate halves of each alternate layer and then rotating each gripped half by 180° as will be explained in more detail below. In any event, the result is a layer 12 having its original lighter core split apart and positioned on the outside of the layer while the darker and harder fired bricks have been moved into the center of the layer. In other words, the bricks have been rearranged in each alternate layer to place bricks from the normally occurring core section areas into the normally occurring shell section areas and vice versa.

After each alternate layer of bricks has been rearranged as in layer 12 of FIG. 1, both the rearranged layers 12 and the remaining layers 10 are restacked on top of one another as shown in FIG. 2. While FIG. 2 is shown with the same number of bricks in each layer as in the original layers 10 and 12, it should be appreciated that this is not necessarily the case and that in any event the resulting blended stack 40 will be comprised of rows or (slices) 42, 44, 46, 48 which have substantially equal numbers of bricks having various hardness and/or color characteristics.

For explanatory purposes, the blended stack shown in FIG. 2 is a simple double layered stack wherein the top layer has been rearranged while the bottom layer remains as it was from the original brick hack in the kiln. Accordingly, row 42 comprises a top row of relatively dark harder bricks while it has a bottom row including substantial numbers of the lighter less hard bricks from the inner core of the hack. Similarly, row 44 of the blended stack 40 has similar constituent bricks although the top and bottom rows of this row are interchanged with respect to row 42 as may be seen, for instance, in the cutaway portion of FIG. 2 revealing the core section of the lower layer of the blended stack.

It should now be apparent that other brick rearrangements might also be performed to achieve similar results. For instance, the inner rows of some layers could be interchanged with outer rows of the same or other layers. Half of each layer could be rearranged with the relative position of the rearranged half alternating between successive layers, etc. However, it will be seen that these techniques involve the movement of bricks in a predetermined proportion of layers from normal core areas to normal shell areas and vice versa.

An exemplary blending apparatus is shown in FIG. 3. A hack of bricks 50 from a kiln comprises a top layer (double or single) of bricks 52, a next layer (double or single) of bricks 54, etc. This hack of fired brick is then passed under a conventional brick unstacking gripper or unloading gripper 56 which picks up each layer of fired bricks, closes the layer up into a compact layer and rotates it if necessary before finally translating it as a layer 58 on a conveyor 60 moving in the general direction of arrow 62.

The layer 58 may be a double layer of bricks in some types of systems and if so, the gripper 56 is retracted by the height of one brick layer after initially depositing the double layer onto the conveyor belt 60 whereupon it is operated to pick up the top layer while letting the bottom layer move out from thereunder on the conveyor 60. Then, the top layer is deposited in a subsequent position on belt 60 before the gripper 56 moves back over to unstack yet another double layer from the kiln car.

In the event of such a double layer, the top layer of each such double layer (the second layer to be deposited onto the belt 60) will be picked up by a conventional turnover device 64 and rotated by 180° so that the brick faces in this layer are now in the same orientation as the faces from the bottom layer.

Accordingly, whether the brick layers in the hack are originally single layers or double layers, the eventual results will be single layers of bricks with commonly oriented faces in this exemplary embodiment. However, it should be appreciated that the blending operation of this invention may also be utilized with more than single layers of bricks.

Each layer of bricks such as layers 58 and 66 may be sensed by conventional means such as the light source 68 and photo electric sensor 70 which, together with a conventional counter, bistable device or the like comprise an alternate layer detector 72 may be utilized to sense every second layer passing down conveyor 60 or at least some predetermined proportion of such layers as will be apparent.

Thus, for every alternate layer, the alternate layer detector 72 actuates a conventional control means 74 to cause two conventional grippers 76, 78 to each grip one- half of the layer thereunder. Subsequently, control 74 conventionally actuates the hydraulic cylinder 80 whereupon each of the grippers 76, 78 are separated before being conventionally rotated by 180°. Then, the hydraulic cylinder 80 is conventionally retracted to move the grippers 76, 78 back together again whereupon the brick groups are released again onto the conveyor belt 60 to result in alternate ones of the layers having been rearranged as should now be apparent from FIG. 3.

Thereafter, the rearranged and other unaltered layers are regrouped into suitable numbers of rows and columns for being restacked by conventional brick stacking means 82. For instance, as shown in FIG. 3, the bricks may be moved against a barrier 84 which is appropriately controlled by a regrouping control means 86 to permit groups of bricks such as groups 88, 90 and 92 to move out onto a second conveyor 94. For instance, groups of bricks 88, 90 and 92 may be produced by intermittently controlling conveyor 60 and/or stop 84 while continuously running the conveyor 94. The groups 88, 90 and 92 are illustrative of a layer formed with spaces for forklift handling after assembling into an overall composite blended stack 96. The layers then picked up from belt 94 by conventional brick stacking mechanism 82 and placed into a stacker jig at position 96 as should be apparent. As previously explained in FIG. 2, each "slice" 98, 100, 102 and 104 of the blended stack 96 will have approximately equal numbers of bricks having different hardness or color characteristics.

The blending section of the system shown in FIG. 3 then comprises the two grippers 76, 78 together with the hydraulic cylinder 80 and their associated control mechanisms. Typically, this blender mechanism may also be controlled by the movement of the conveyor 60 to cause it to pick up every second layer and rotate the halves of that layer so that the outside bricks are positioned within the middle of the layer and vice versa. As shown in FIG. 3, the unloading machine handles all of the bricks with their faces commonly oriented upwardly and achieves brick blending by rotating the halves of every second layer of bricks as should now be apparent.

The blending section of the system shown in FIG. 3 is shown in more detail in FIG. 4. The grippers 76 and 78 each pick up half of the layer 106 from the conveyor belt or other transport means 60. Thereafter, gripper 76 is moved away from the gripper 78 with a spreading means or separating means comprising the exemplary hydraulic cylinder 80 mounted on the overall gripper suspension frame 108. After separation, the individual grippers 76, 78 are rotated by conventional rotating means 110, 112 about 180° before the grippers 76 and 78 are again closed back up with the spreading means 80 so that the formerly outside bricks of the layer are now in the middle and vice versa. The rearranged layer 106 is then released back on to the conveyor belt 60. The gripper suspension frame 108 may be suspended from a gripper lifting device with chains, cables, etc., as should be appreciated.

While only a few embodiments of this invention have been specifically described and explained in detail above, those in the art will readily appreciate that many modifications, variations and/or adaptations of the exemplary method and/or apparatus may be made without in any way departing from the spirit, scope and/or teaching of this invention. Accordingly, all such modifications, variations and/or adaptations are intended to be included within the scope of this invention.

What is claimed is:

1. A method for blending a stack of bricks comprising a plurality of vertically superimposed layers, each layer comprising a plurality of bricks, said stack having a central core section of lesser hardness and lighter color than in the surrounding outer shell section thereof, said method comprising the steps of
   a. unstacking an entire first layer of bricks from said stack, said layer including a corresponding core section and shell section,
   b. unstacking an entire second layer of bricks from said stack, said layer including a corresponding core section and shell section,
   c. transporting said second layer to a rearranging position,
   d. rearranging bricks within said second layer with respect to each other, to place bricks from the normally occurring core section areas into the normally occurring shell section areas and vice versa,
   e. transporting said first and second layers to a restacking position,
   f. restacking said first and second layers of bricks,
   g. repeating said unstacking, transporting, and rearranging steps until a new stack is formed having increased uniformity in the spatial distribution of bricks having different hardness and color characteristics.

2. A method as recited in claim 1 wherein said step of rearranging bricks within said second layer with respect to each other is accomplished by rotating about a vertical axis a plurality of bricks within said layer with respect to other bricks in said layer.

3. A method as recited in claim 2 wherein said rearranging step is further accomplished by rotating bricks in a first half of said layer 180° about said vertical axis, and rotating bricks in a second half of said second layer 180° about said vertical axis.

4. A method as recited in claim 1 wherein said first and second layers are each only one brick high.

5. A method as recited in claim 1 comprising the further steps of
   transporting said first layer to a rearranging position, and
   rearranging bricks within said first layer with respect to each other to place bricks from the normally occurring core section areas into the normally occurring shell section areas and vice versa.

6. A method as recited in claim 5 wherein said steps of rearranging bricks within said first and second layers are accomplished by rotating about a vertical axis a plurality of bricks within each said layer with respect to other bricks in each said layer.

7. A method as recited in claim 5 wherein said rearranging step is accomplished by transposing predetermined groups of bricks within each said first and second layers.

8. A method as recited in claim 1 wherein said rearranging step is accomplished by transposing predetermined groups of bricks within said second layer.

* * * * *